US009620925B2

United States Patent
Keen et al.

(10) Patent No.: US 9,620,925 B2
(45) Date of Patent: Apr. 11, 2017

(54) FIBER OPTICAL LASER COMBINER

(71) Applicant: SPI Lasers UK Limited, Southhampton (GB)

(72) Inventors: Stephen Keen, Warwickshire (GB); Stephen Moore, Warwickshire (GB); Iain Botheroyd, Warwickshire (GB)

(73) Assignee: SPI Lasers UK Limited, Southhampton (GB)

( * ) Notice: Subject to any disclaimer, the term of this patent is extended or adjusted under 35 U.S.C. 154(b) by 0 days.

(21) Appl. No.: 14/764,295

(22) PCT Filed: Jan. 27, 2014

(86) PCT No.: PCT/GB2014/050203
§ 371 (c)(1),
(2) Date: Jul. 29, 2015

(87) PCT Pub. No.: WO2014/118516
PCT Pub. Date: Aug. 7, 2014

(65) Prior Publication Data
US 2015/0372444 A1 Dec. 24, 2015

(30) Foreign Application Priority Data

Jan. 31, 2013 (GB) .................. 1301745.4

(51) Int. Cl.
*H01S 3/10* (2006.01)
*G02B 6/255* (2006.01)
*G02B 6/28* (2006.01)
*G02B 6/04* (2006.01)
*G02B 6/43* (2006.01)
(Continued)

(52) U.S. Cl.
CPC .................. *H01S 3/10* (2013.01); *G02B 6/04* (2013.01); *G02B 6/255* (2013.01); *G02B 6/2551* (2013.01); *G02B 6/2856* (2013.01); *G02B 6/43* (2013.01); *G02B 27/0905* (2013.01);
(Continued)

(58) Field of Classification Search
USPC ...................................... 385/31, 43
See application file for complete search history.

(56) References Cited

U.S. PATENT DOCUMENTS 3,777,150 A 12/1973 Miller
6,501,884 B1 12/2002 Golowich
(Continued)

FOREIGN PATENT DOCUMENTS

GB 2307059 A 5/1997
WO WO2005029146 A1 3/2005
WO WO2009080039 A1 7/2009

OTHER PUBLICATIONS

Notification concerning Transmittal of International Preliminary Report on Patentability for corresponding PCT Application No. PCT/GB2014050203, mailed Aug. 13, 2015, 7 pages.
(Continued)

*Primary Examiner* — Eric Wong
(74) *Attorney, Agent, or Firm* — Fish & Richardson P.C.

(57) ABSTRACT

An optical combiner (25), comprising a bundle of input fibers (24) spliced to an output fiber (26), the output fiber having a cladding and at least one high-index portion within the cladding, such that the high index portion has a diameter substantially equal to or less than the outer diameter of the input fiber bundle at the splice point.

20 Claims, 5 Drawing Sheets

(51) Int. Cl.
    *G02B 27/09*     (2006.01)
    *H01S 3/067*     (2006.01)
    *H01S 3/23*     (2006.01)

(52) U.S. Cl.
    CPC .......... *G02B 27/0994* (2013.01); *H01S 3/067* (2013.01); *H01S 3/23* (2013.01)

(56) References Cited

U.S. PATENT DOCUMENTS

| | | | |
|---|---|---|---|
| 7,592,568 B2 | 9/2009 | Varnham | |
| 2003/0072525 A1* | 4/2003 | Sjodin | G02B 6/4206 385/31 |
| 2005/0105854 A1* | 5/2005 | Dong | G02B 6/2551 385/46 |
| 2007/0003196 A1* | 1/2007 | Holcomb | H01S 3/094003 385/115 |
| 2009/0154881 A1 | 6/2009 | Salokatve | |
| 2013/0223792 A1 | 8/2013 | Huber | |
| 2014/0119694 A1* | 5/2014 | Abedin | G02B 6/02042 385/43 |
| 2016/0268757 A1* | 9/2016 | Hosokawa | H01S 3/06729 |

OTHER PUBLICATIONS

Gambling et al., "Mode Conversion Coefficients in Optical Fibers", Applied Optics, vol. 14, No. 7, Jul. 1975, 5 pages.

Zubia et al, "New Method to Calculate Mode Conversion Coefficients in SI Multimode Optical Fibers", Journal of Lightwave Technology, vol. 21, No. 3, Mar. 2003, 6 pages.

International Search Report for corresponding PCT Application No. PCT/GB2014/050203, mailed Apr. 24, 2014, 2 pages.

\* cited by examiner

FIBER OPTICAL LASER COMBINER

CROSS-REFERENCE TO RELATED APPLICATIONS

This application is a 371 application of International PCT Application No. PCT/GB2014/050203 filed on Jan. 27, 2014, which claims priority to Great Britain Application No. GB 1301745.4, filed on Jan. 31, 2013. The contents of both of these priority applications are hereby incorporated by reference in their entireties.

TECHNICAL FIELD

This invention relates to a fibre optical laser combiner. In particular, it relates to a combiner for combining the output from several lasers into a single output fibre, and apparatus and methods for controlling the spatial beam profile emitted from that fibre.

BACKGROUND

Many laser-processing schemes rely on beam delivery via an optical fibre. This fibre is usually radially symmetric (of circular cross-section) and has a uniform refractive index profile (otherwise known as step-index). The beam emitted from such a fibre is thus also circularly symmetric and produces a generally uniform distribution of light on a workpiece receiving a laser beam via the beam delivery optical fibre.

For many applications it is desirable to produce tailored non-uniform light distributions on the workpiece, such as an annular profile or profiles having a central peak. Schemes are available for producing such profiles but are often complex and involve the use of free-space optics. The use of these is undesirable, particularly with high-power fibre-laser systems.

One method of producing high power fibre laser systems is to combine the outputs from several lasers via a tapered fibre bundle, spliced to an output fibre. Each laser is delivered to the bundle via a separate input fibre, the laser beams in the separate input fibres are then combined and all their inputs exit via the same single output fibre. These are known generally as output combiners. One aspect of such a combining scheme is that, although the individual input fibres are located in close proximity to each other, the inputs are distinct while they remain in the tapered bundle. The standard output fibre collects all of the inputs and produces a uniform output as all the inputs are overlapped by the same circularly symmetric single refractive index region.

WO 2011/048398 discloses a system having a tapered input fibre bundle.

SUMMARY

The present invention arose in an attempt to provide a combining arrangement which can produce a non-uniform, or tailored light distribution at a workpiece.

According to the present invention in a first aspect there is provided an optical combiner, comprising a bundle of input fibres spliced to an output fibre, said output fibre comprising a first region with refractive index n0 and diameter equal to or greater than the input fibre bundle diameter and one or more secondary regions within the first region, the second regions each having refractive index that differs from n0, each of the secondary regions not overlying all of the input fibres.

The secondary regions are thereby arranged such that they provide coupling from only a subset of the input fibres.

A secondary region is said to overlie an input fibre if the end face of the input fibre is enclosed or partially enclosed within the end face of the secondary region.

The first region has a diameter which is preferably equal or substantially equal to the diameter of the input fibre bundle at the splice point.

The output fibre may be a double-clad output fibre.

The first region may be a cladding.

The secondary region may comprise a central core.

The secondary region may alternatively or in addition comprise one or more annular regions.

Where the secondary region comprises at least one annular region, the input fibre bundle comprises at least one radially outer set of input fibres, and said annular region overlies said radially outer input fibres.

The output fibre may have a secondary region surrounded by a first region, and the input fibre bundle may have a central fibre and a plurality of fibres radially surrounding this, such that the secondary region of the output fibre is of diameter equal to or less than the diameter of the central input fibre. It is preferably positioned with its entry face lying within the area defined by the output face of said central input fibre. It may be co-axial therewith. The secondary region in this or other embodiments may be circular or elliptical, for example, or have other shapes.

Other configurations of the output fibre may be used. In embodiments in which an output fibre has a central secondary region and surrounding first region, e.g., a central core and a surrounding cladding, it is observed that the central core acts to capture the majority of the light from a central input fibre and thus tends to give a pronounced peak in the centre of an output beam profile. Furthermore, a portion of light from the outer input 'port' (i.e., input fibres) can also be captured by the central core of the output fibre. This can lead to a profile having a central peak, which is beneficial for a range of laser processing operations.

In embodiments in which an output fibre has an annular secondary region, such as a circular high-index ring that overlaps with the outer fibres of the input bundle, then a majority of the input light is coupled directly to the annular pedestal which is formed by the high-index ring. This leads to an intensity profile of light output against the diameter which has an annular peak. This method of producing an annular beam is a robust and simple method compared to other bulk optic schemes. Furthermore, the brightness increases, typically by the ratio of the overall fibre area to the annular pedestal area. Such a profile is also beneficial for a wide range of laser processing applications.

In a further aspect, the invention provides a method of providing a single output from a plurality of lasers, comprising providing an input fibre bundle having a plurality of input fibres receiving laser outputs from each of a plurality of lasers, and splicing the bundle, at a splice point, to a single output fibre; said output fibre comprising a first region with refractive index n0 and diameter equal to or greater than the input fibre bundle diameter and also includes one or more secondary regions within the first region, the secondary regions each having refractive index that differs from n0, each of the secondary regions not overlying all of the input fibres.

The secondary regions may be an annular region or a plurality of annular regions, a combination of a central core and one or more annular regions, or other configurations where more than one high-index region is provided, which regions may be of different refractive indices.

In a further aspect, the invention provides a laser system including an output combiner as described.

In a further aspect, the invention provides a method of material processing, or of tailoring a beam profile during material processing, using a method or apparatus as described.

DESCRIPTION OF DRAWINGS

Embodiments of the invention will now be described, by way of example only, with reference to the accompanying schematic drawings, in which.

DETAILED DESCRIPTION

Figure 1:
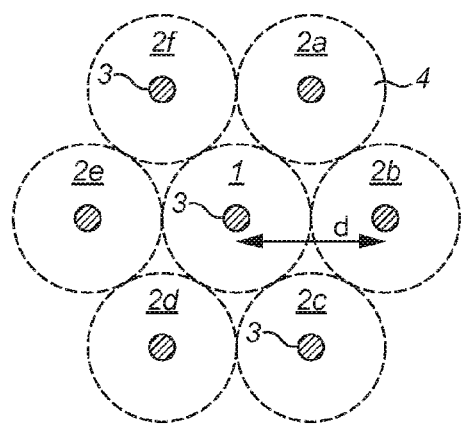
FIG. 1 shows an end view of input fibre bundle.
Figure 2:
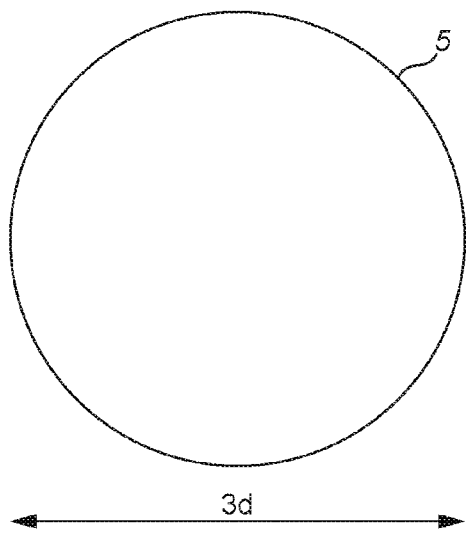
FIG. 2 shows a matching output fibre without a secondary region.
Figure 3:
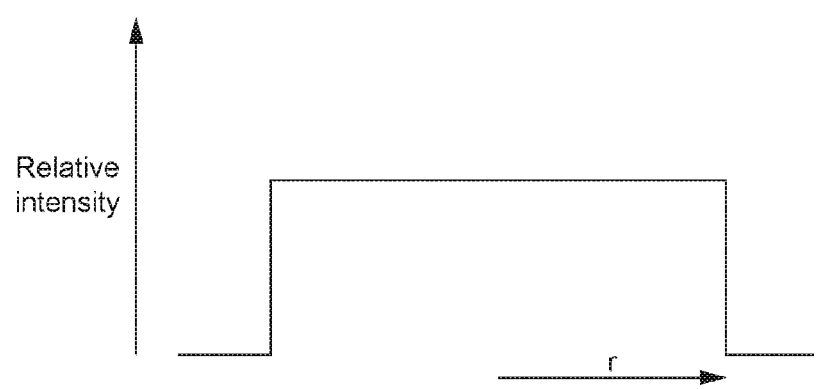
FIG. 3 shows a plot of output intensity.

FIGS. 1 to 3 show a previously proposed system. An input fibre bundle comprises a bundle of seven fibres comprising a first central fibre 1 and six outer fibres 2a to 2f. Each fibre has a cladding 4 (of diameter d) and a core 3. The fibre bundle is tapered in a known manner. It receives inputs from seven separate fibre lasers at a proximal end and the distal end is shown in the figure, from which the individual laser outputs are emitted via the separate fibres. This is spliced to a matching output fibre 5 typically of cladding diameter 3d. In the output fibre, the individual outputs from the separate laser, which have been applied through the individual fibres of the fibre bundle shown in FIG. 1 are combined the resulting beam is output at the output end of the output fibre 4. FIG. 3 shows approximately the relative intensity of the output across the diameter of the output phase of the fibre and it will be seen that this is generally uniform across the entire diameter. Of course, the diagram is simplified and there may be slight variations in practice.

FIG. 4 again shows a similar input fibre bundle to that of FIG. 1. Note that the input fibre bundles themselves are well known and comprise a central core 3 and an outer cladding region. This is spliced to an output fibre 6 shown in FIG. 5 which differs from that of FIG. 2 by having a central core 7 and a surrounding cladding 8. Thus, the cladding region 8 is a first region of refractive index n0, and the core 7 is a secondary region of index n1, different to n0. The cladding diameter is approximately equal to the outer diameter of the tapered input fibre bundle and thus is of diameter approximately 3d. The central core is of higher refractive index than the cladding. In one embodiment, the refractive indices are as follows:

Core=1.459
Cladding=1.455
NA=0.11

Figure 5:
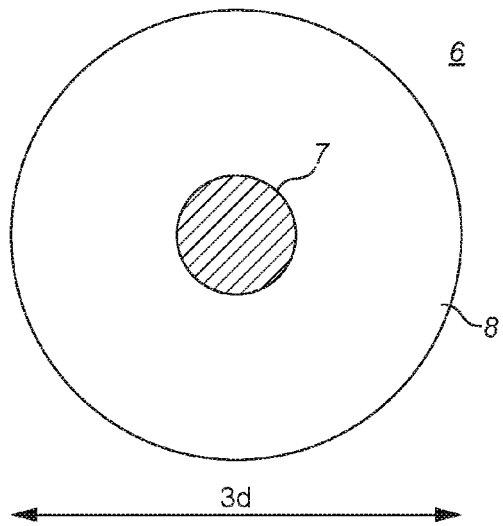
FIG. 5 a matching output fibre with a secondary region.
Figure 6:
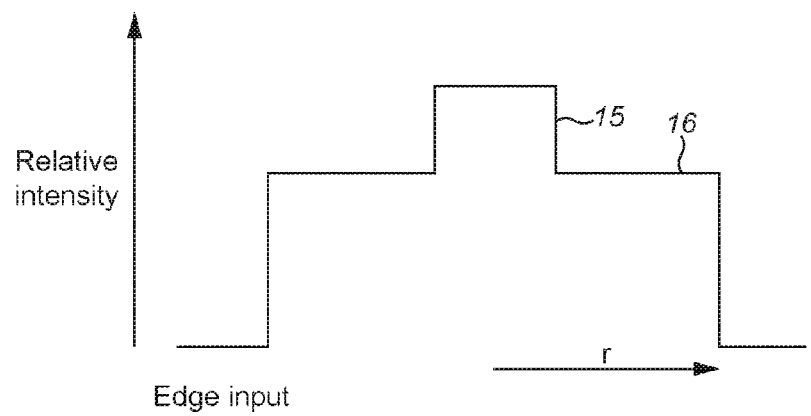
FIG. 6 shows a plot of output intensity with edge input.
Figure 11:
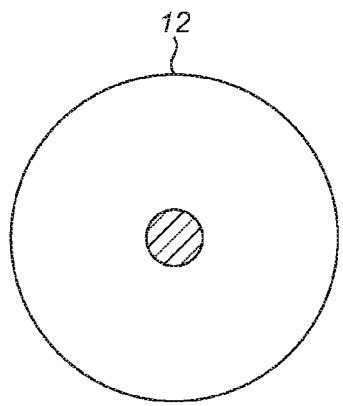
FIG. 11 shows an output fibre similar to FIG. 5.
Figure 12:
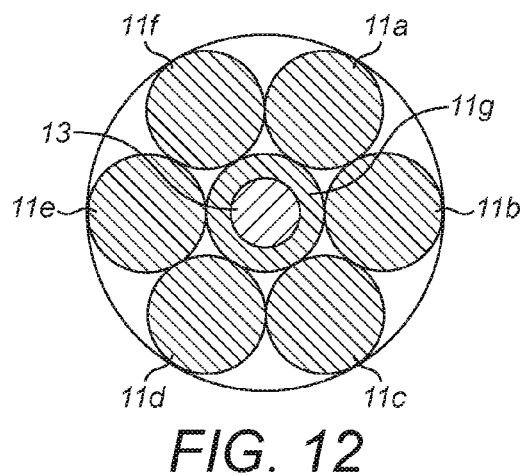
FIG. 12 shows the output fibre overlapped with a tapered input fibre bundle.

FIG. 11 also shows the output fibre of FIG. 5 and FIG. 12 shows this superimposed upon a cross-sectional view of the tapered input fibre, illustrating the individual input fibres 11a to 11g and the output fibre 12 having a core 13 which lies generally concentric (coaxial) with, or at least inside (or coextensive with) a central fibre 11g. It is observed that the inner core (7, 13) acts to capture the majority of light from the central input fibre 11g and thus gives a pronounced peak 15 in the output beam profile which is shown in FIG. 6. Furthermore, it is also observed that a portion of the light from the outer input fibre (input ports) 11a to 11f is also captured by the central core of the output fibre. Thus, a profile as shown in FIG. 6 or in FIG. 7 for example with a central peak 15 above a plateau level 16 is obtained. Such a profile is beneficial for a range of laser-processing operations.

Figure 7:
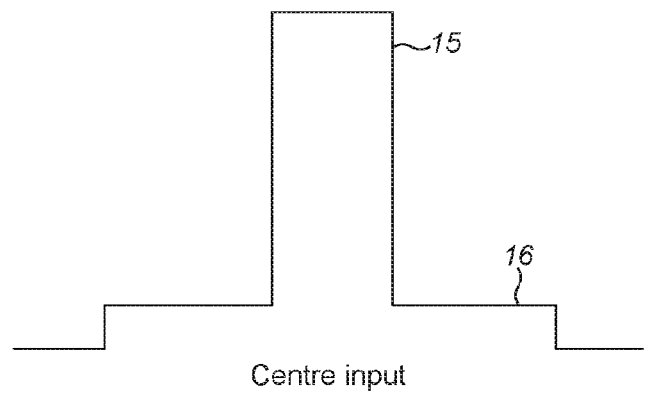
FIG. 7 shows a plot of output intensity with a centre input.

FIG. 7 shows an example of a centre input (ie where the input comes mainly or wholly from the central input fibre) and FIG. 6 shows an example of an edge input, in which the majority of the input comes from the ring of fibres surrounding the central input fibre. It is seen that with a centre input a much more pronounced peak is obtained but a significant peak is still obtained with an edge input. By varying the type of input and also the index and size of the central core and/or cladding different outputs can be obtained for different uses.

Figure 4:
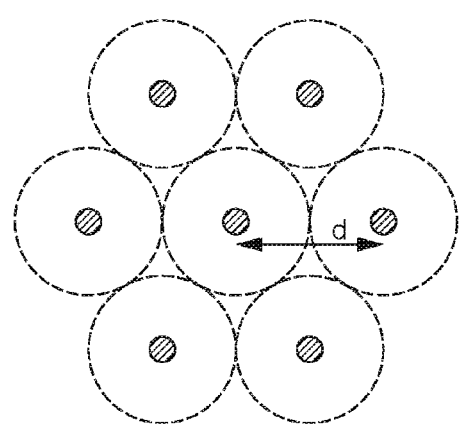
FIG. 4 shows an end view of a fibre bundle.
Figure 8:
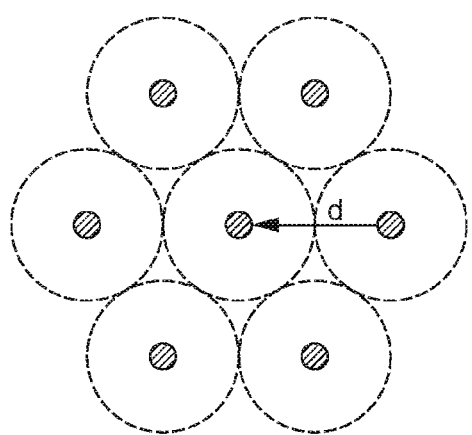
FIG. 8 shows an end view of an input bundle.

FIG. 8 again shows an input fibre bundle similar to that of FIG. 4.

Figure 9:
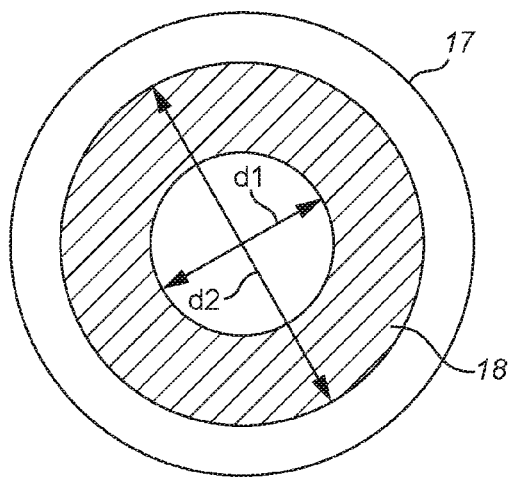
FIG. 9 shows a matching output fibre a secondary region.
Figure 13:
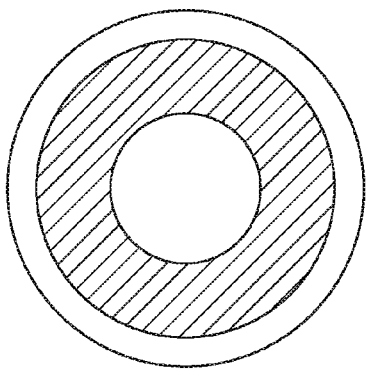
FIG. 13 shows an annular high-index region output fibre similar to that of FIG. 9.
Figure 14:
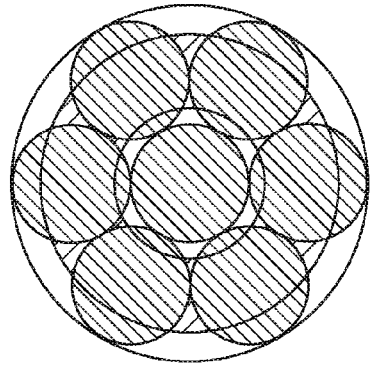
FIG. 14 shows the output fibre of FIG. 13 overlapped with a tapered input fibre bundle.

FIG. 9 shows an output fibre 17 having an annular relatively high-index region 18. FIG. 13 shows an annular high-index region output fibre similar to that of FIG. 9, and FIG. 14 shows the output fibre of FIG. 13 overlapped with a tapered input fibre bundle. As is shown in FIG. 14, this most preferably overlaps the outer fibres (11a to 11f) of the input tapered fibre bundle shown in FIG. 8. That is, the inner diameter d1 is greater than or equal to d (the diameter of an input fibre) and the outer diameter d2 of the annular region is less than or equal to 3×d, as is shown in FIG. 14 where the annulus is shown as being overlapped with the outer input fibres.

Figure 10:
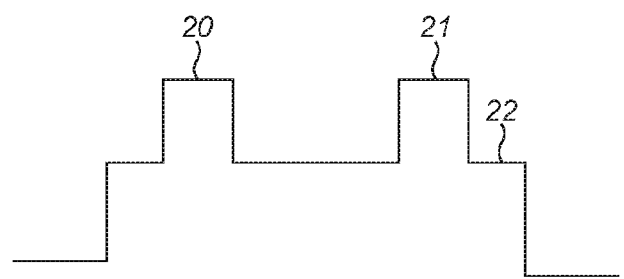
FIG. 10 shows a plot of output intensity.

This leads to an output profile as shown schematically in FIG. 10 having an annulus 20, 21 above a plateau 22. In such an output fibre which has an annular high-index region that overlaps with the outer fibres of the tapered input bundle, the large majority of the input light is coupled directly to this annular pedestal. The efficiency of the system tends to be very high compared with free space methods of annular beam generation. In addition, it is found that the brightness of the source actually increases (by the ratio of the overall fibre area to the annular pedestal area).

Figure 15:
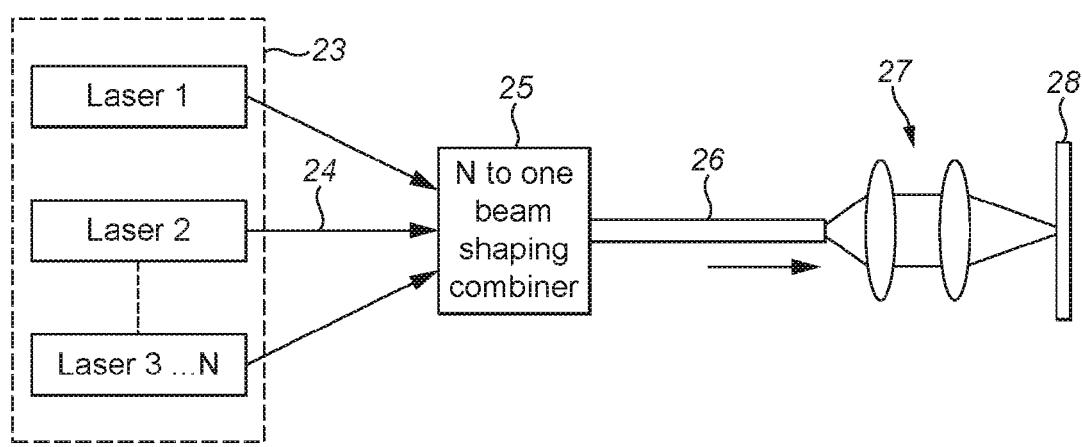
FIG. 15 shows a system usable for material processing.

FIG. 15 shows a typical application of the invention in a material processing application. The laser sub units 23 shown may have an output power of up to 1.5 kW and the combined beam at 26 may be up to 10 kW. The laser source from combiner 25 is directed via coupling optics 27 onto the material to be modified 28.

N individual fibre laser sources 23 are coupled into the combiner 25 through their respective feed fibres 24. The combiner is formed by the fusion of the feed fibre 24 and the delivery fibre 26. Through the choice of refractive index profile of the delivery fibre 26 and the orientation of the feed fibres 24 relative to this fibre the output beam profile at 28 can be controlled as described earlier in this application. Examples of the profiles are shown in FIGS. 6, 7 and 10.

A further aspect of this invention is fast switching of the mode profile. By individually addressing/controlling the component lasers 23 the output beam profile at 28 can be switched. For example using the combiner described in FIGS. 4 and 5 excitation of all the lasers produces a broad near flat top profile ideal for welding and thick section cutting. Excitation of just the central port laser on the other hand produces a narrow beam profile which is ideal for thin section cutting. Thus, each laser may be switched ON or OFF, during a material processing operation, independently of the other laser, to alter or tailor the beam profile. The time to switch between these two profiles is limited by the response time of the control electronics for the individual lasers 23. Typically this can be of the order of tens of microseconds. This time is far faster than alternative bulk optic switching methods that have been used previously to control the beam profile. This rapid switching time enables the possibility of in process beam profile switching for optimised material processing.

One, two or more of the N lasers may be turned ON or OFF, or their output varied, to alter the beam profile.

The embodiments shown and described are illustrative only and other embodiments may be used. Some may have a central core and one or more annular or other shape regions of relatively high-index compared to the rest of the output fibre. Other shapes may be used for different beam profiles.

What is claimed is:

1. A laser system comprising:
   (i) an optical combiner comprising:
      an input fiber bundle comprising a plurality of input fibers; and
      an output fiber, wherein the input fiber bundle is spliced to the output fiber, and
      wherein the output fiber comprises:
         a first region having a first refractive index and a diameter equal to or greater than a diameter of the input fiber bundle, such that an end face of each of the input fibers defines a respective area within an area defined by the diameter of the first region; and
         at least one secondary region within the area defined by the diameter of the first region having a second refractive index different from the first refractive index, wherein the at least one secondary region is arranged to overlap the respective areas defined by the end faces of more than one but not all of the input fibers;
   (ii) a plurality of lasers connected to the plurality of input fibers; and
   (iii) a controller arranged to adjust a laser output of at least one of the plurality of lasers independently to tailor a beam profile of a beam output from the output fiber.

2. The system of claim 1, wherein the secondary region comprises a central core.

3. The system of claim 1, wherein the secondary region comprises at least one annular region.

4. The system of claim 3, wherein the input fiber bundle comprises at least one radially outer set of the input fibers, and wherein the at least one annular region overlays the radially outer set of the input fibers.

5. The system of claim 4, wherein the at least one annular region has an inner diameter and an outer diameter, and wherein the inner diameter is equal to or greater than a diameter of one of the input fibers, and the outer diameter is equal to or less than three times the diameter of one of the input fibers.

6. The system of claim 5, wherein the input fibers each have substantially the same outer diameter.

7. The system of claim 6, wherein the input fiber bundle comprises an inner fiber and a plurality of fibers surrounding the inner fiber, and wherein the annular region is arranged not to overlay the inner fiber.

8. The system of claim 1, wherein the input fiber bundle comprises an inner fiber and a plurality of fibers radially surrounding the inner fiber, wherein the secondary region comprises a central core, wherein the first region comprises a cladding surrounding the central core, and wherein the central core has a diameter equal to or less than a diameter of the inner fiber.

9. The system of claim 8, wherein the central core is positioned with its entry face lying within an area defined by an output face of the inner fiber.

10. The system of claim 9, wherein the central core is co-axial with the inner fiber.

11. The system of claim 1, wherein the controller is configured to switch at least one of the plurality of lasers on and off with a response time in a range of tens of microseconds.

12. A method of providing a single output from a plurality of lasers, the method comprising:
    (a) obtaining a laser system comprising:
       (i) an optical combiner comprising:
          an input fiber bundle comprising a plurality of input fibers; and
          an output fiber, wherein the input fiber bundle is spliced to the output fiber, and
          wherein the output fiber comprises:
             a first region having a first refractive index and a diameter equal to or greater than a diameter of the input fiber bundle, such that an end face of each of the input fibers defines a respective area within an area defined by the diameter of the first region; and
             at least one secondary region within the area defined by the diameter of the first region having a second refractive index different from the first refractive index, wherein the at least one secondary region is arranged to overlap the respective areas defined by the end faces of more than one but not all of the input fibers; and
       (ii) a plurality of lasers connected to the plurality of input fibers; and
    (b) controlling a laser output of at least one of the plurality of lasers independently to tailor a beam profile of a beam output from the output fiber.

13. The method of claim 12, wherein the plurality of lasers comprises a plurality of fiber lasers.

14. The method of claim 12, wherein the secondary region comprises at least one annular region having a relatively higher refractive index than other regions of the output fiber.

15. The method of claim 14, wherein the input fiber bundle comprises an inner fiber and a plurality of radially outer fibers, and wherein the annular region overlaps the radially outer fibers.

16. The method of claim 15, wherein the annular region has a diameter greater than or equal to a diameter of one of the input fibers and less than or equal to three times the diameter of one of the input fibers.

17. The method of claim 12, wherein the output fiber comprises a central core with a diameter equal to or less than a diameter of an inner fiber of the input fibers.

18. The method of claim 17, wherein the central core of the output fiber is positioned with its entry face lying within an area defined by an output face of the inner fiber.

19. The method of claim 12, wherein the laser output of one, two, or more of the plurality of lasers is adjusted during a material processing operation to alter the output beam profile.

20. An optical combiner comprising:
  an input fiber bundle comprising a plurality of input fibers; and
  an output fiber, wherein the input fiber bundle is spliced to the output fiber, and
  wherein the output fiber includes:
    a first region with a first refractive index and a diameter equal to or greater than a diameter of the input fiber bundle, such that an end face of each of the input fibers defines a respective area within an area defined by the diameter of the first region; and
    at least one secondary region being within the area defined by the diameter of the the first region and configured to have a second refractive index different from the first refractive index and to overlap the respective areas defined by the end surfaces of more than one but not all of the input fibers, wherein the secondary region comprises at least one annular region.

\* \* \* \* \*